(No Model.)
E. BOSWORTH.
WATER TIGHT JOINT FOR TILING, VAULT COVERS, AREAS, &c.
No. 284,170. Patented Sept. 4, 1883.
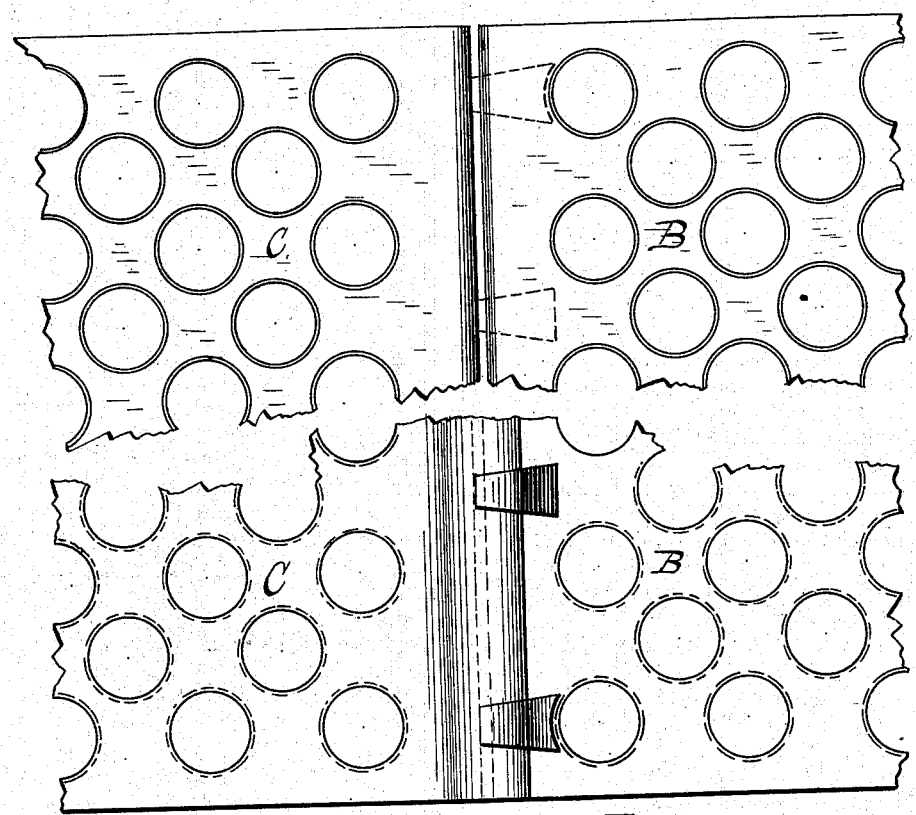
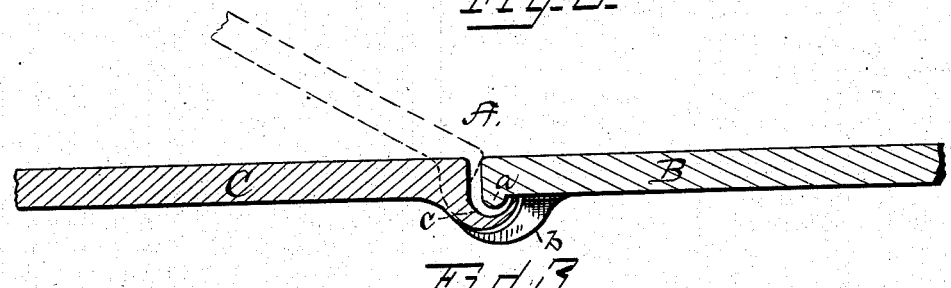
WITNESSES
INVENTOR

United States Patent Office.

EMORY BOSWORTH, OF CLEVELAND, OHIO.

WATER-TIGHT JOINT FOR TILING, VAULT-COVERS, AREAS, &c.

SPECIFICATION forming part of Letters Patent No. 284,170, dated September 4, 1883.

Application filed February 23, 1883. (No model.)

*To all whom it may concern:*

Be it known that I, EMORY BOSWORTH, a citizen of the United States of America, residing at Cleveland, in the county of Cuyahoga and State of Ohio, have invented certain new and useful Improvements in Water-Tight Joints for Tiling, Vault-Covers, Areas, &c.; and I do hereby declare the following to be a full, clear, and exact description of the invention, such as will enable others skilled in the art to which it appertains to make and use the same.

This invention has relation to improvements in grating-tile, and especially to such as are illuminated and used for covering vaults, areas, floors, roofs, and skylights; and the object is to provide for grating-tiles of the class mentioned a water-tight lock-joint for uniting the different sections or plates of the tiling.

My invention therefore consists in forming the edge of one section of grating-tile with a transverse ridge, and a projecting hook impending over the ridge and forming the adjoining section of grating-tile, with a transverse projecting hook adapted to fit over the ridge and under the hook of its adjacent piece.

In the accompanying drawings, forming a part of this specification, Figure 1 is a plan view of two sections of grating-tile united by my improved water-tight lock-joint. Fig. 2 is a reverse view, showing the joint from beneath; and Fig. 3 is a sectional view, showing the method of hooking the plates together and the configuration of the joint.

The letter A represents adjoining plates or sections of grating-tile. Plate B of these tiles is formed with the ridge $a$ extending across its width, and also is formed with the hooked flange $b$, which is so formed and placed as to form a groove between its inner line of base and the transverse ridge $a$, for the purpose hereinafter mentioned. Plate C of the grating-tile is formed with the hooked flange $c$ extending the width of the plate and beyond the edge thereof, substantially as seen in the drawings. This hook, it will be seen, conforms to the shape of the space between the ridge of the hook on the adjoining plate, and extends under the former into the groove between them. The hooked flange $b$, instead of being continuous, may be divided into sections.

It will be seen that when the parts are united the hook of one plate lies in the other and forms an overlap at the meeting edge of the two sections. Putty, cement, or similar substance may be filled in the lip or groove on the lower plate before uniting the plates, and after the plates are joined any crack or space in the upper part of the joint may be filled with like material. United in this way water cannot effect an entrance through the joint, nor is any bolt required to keep the plates in place, as is usually required in other methods.

The advantages of this joint are at once apparent to those versed in the art.

I claim the right to vary the shape of the joint without departing from the spirit of the invention.

What I claim as my invention, and desire to secure by Letters Patent, is—

1. A grating-tile or illuminating vault-cover with a water-tight lock-joint constructed substantially as described.

2. A grating-tile or illuminating vault-cover section formed with a transverse ridge across the edge, and a projecting hooked flange under the ridge, in combination with another adjacent section formed with a projecting hook-flange adapted to fit under the ridge and over the hooked flange of the adjacent tiling, substantially as described.

In testimony whereof I affix my signature in presence of two witnesses.

EMORY BOSWORTH.

Witnesses:
 GEO. H. FOSTER,
 CHAS. STUMM.